(12) United States Patent
Schutz et al.

(10) Patent No.: US 8,153,265 B2
(45) Date of Patent: Apr. 10, 2012

(54) COATED SUBSTRATE AND PROCESS FOR THE PRODUCTION OF A COATED SUBSTRATE

(75) Inventors: Alain Schutz, Glacerie (BE); Pieter Jacot, Glacerie (BE); Fabian Mariage, Jumet (BE)

(73) Assignee: AGC Flat Glass Europe, Brussels (BE)

( * ) Notice: Subject to any disclaimer, the term of this patent is extended or adjusted under 35 U.S.C. 154(b) by 839 days.

(21) Appl. No.: 11/912,906

(22) PCT Filed: Apr. 28, 2006

(86) PCT No.: PCT/EP2006/061935
§ 371 (c)(1),
(2), (4) Date: Aug. 7, 2008

(87) PCT Pub. No.: WO2006/117345
PCT Pub. Date: Nov. 9, 2006

(65) Prior Publication Data
US 2009/0011206 A1    Jan. 8, 2009

(30) Foreign Application Priority Data

Apr. 29, 2005   (EP) ..................... 05103609

(51) Int. Cl.
*B32B 17/06*   (2006.01)
*B32B 15/04*   (2006.01)
(52) U.S. Cl. .................. 428/432; 428/701; 428/702
(58) Field of Classification Search .................. 428/432, 428/701, 702
See application file for complete search history.

(56) References Cited

U.S. PATENT DOCUMENTS

| 5,073,451 A | 12/1991 | Iida et al. |
| 5,667,880 A | 9/1997 | Okaniwa |
| 5,897,957 A * | 4/1999 | Goodman ..................... 428/432 |
| 6,657,271 B2 * | 12/2003 | Katsuragawa ................ 257/437 |
| 2002/0197824 A1* | 12/2002 | Katsuragawa ................ 438/437 |
| 2004/0180218 A1* | 9/2004 | Nagashima et al. .......... 428/432 |
| 2006/0065299 A1* | 3/2006 | Fukawa et al. ................ 136/256 |

FOREIGN PATENT DOCUMENTS

| EP | 1201616 | 5/2002 |
| JP | 02225345 | 9/1990 |
| JP | 2001-036117 | * 2/2001 |
| JP | 2002-252361 | * 9/2002 |
| WO | WO-2004102677 | * 11/2004 |

OTHER PUBLICATIONS

JP2001-036117, Norimatsu English machine translation.*
JP2002-252361, Fujisawa English machine translation.*

* cited by examiner

*Primary Examiner* — Jennifer McNeil
*Assistant Examiner* — Lauren Robinson
(74) *Attorney, Agent, or Firm* — Oblon, Spivak, McClelland, Maier & Neustadt, L.L.P.

(57) ABSTRACT

A transparent glass-type substrate coated with a stack of thin layers and a process for the production of the substrate coated with a stack of thin layers which are deposited by pyrolysis. The stack of thin layers includes at least one titanium oxide-based underlayer and a tin oxide-based main layer, the coated substrate having a very low haze, while also exhibiting a low emissivity or favourable electrical conductivity.

19 Claims, No Drawings

COATED SUBSTRATE AND PROCESS FOR THE PRODUCTION OF A COATED SUBSTRATE

CROSS-REFERENCE TO RELATED APPLICATIONS

This application is the entry into the United States of PCT Application Number PCT/EP2006/061935 filed Apr. 28, 2006 and claims priority from European Patent Application No. 05103609.3 filed Apr. 29, 2005, the entirety of each of which is hereby incorporated by reference.

BACKGROUND

The present invention relates to a glass-type transparent substrate coated with a stack of thin layers and to a process for the production of a coated substrate. In particular, the coated substrate exhibits properties of low emissivity and low haze.

Tin oxide-based layers are known. For example, layers based on tin oxide doped with fluorine are known for their properties of low emissivity and electrical conductivity. On one hand, these materials provide an increased reflection of the electromagnetic radiation at wavelengths in the range between 3 and 50 μm and therefore allow reflection of infrared radiation. On the other hand, antimony doped tin oxide layers are known both for their property of low emissivity and for their more pronounced absorption in wavelengths in the visible range than fluorine doped tin oxide layers and are used for antisolar and/or thermal insulation applications.

It is also known that tin oxide-based layers deposited onto glass by pyrolysis (in vapour phase—chemical vapour deposition (CVD), in liquid phase (sputtering) or in solid phase (powder sputtering)) generally give a whitish "haze"(Applied Surface Science, 185 (2002) 161-171, J. Szanyi "The origin of haze in CVD tin oxide thin films"). This haze is caused by scattering of the light. This article describes, for example, $SnO_2$:Sb layers with a thickness of 264 and 215 nm, which respectively give a haze of 1.55 and 3.95%.

The standard ASTM D 1003-61 defines the "haze" as the percentage of transmitted light, which, while passing through the sample, deviates from the incident beam by an angle of more than 2.5°.

In order to improve the infrared reflection properties of the tin oxide-based layer, it is generally necessary to increase its thickness. However, the greater the thickness of the deposited tin oxide layer, the more the haze increases. Typically, a tin oxide layer of 500 nanometres gives a haze of 2 to 20%. This haze gives a whitish aspect to the vision in transmission and is therefore redhibitory.

Moreover, it is known that the industrial production of such products causes undesirable variations or non-homogeneity. For example, some zones or isolated points can present an increased haze. These localised faults may be visible to the naked eye and render the product unacceptable.

SUMMARY

Therefore, there is a need to provide a glass-type substrate coated with a tin oxide-based layer, which is highly reflective in the range of 3 to 50 μm (reflection in the infrared electromagnetic radiation) and highly conductive, while also preventing an increase in haze and maintaining the optical properties in the visible range (Light Reflection (LR), Light Transmission (LT), colour in reflection) within acceptable values.

Therefore, the aim of the present invention is to provide glass products that simultaneously exhibit a low emissivity, a favourable electrical conductivity, a haze as low as possible and an excellent homogeneous visual appearance.

According to one of its aspects, the subject matter of the present invention is a transparent glass-type substrate coated with a stack of thin layers comprising:

i) at least one titanium oxide-based underlayer, and
ii) a main tin oxide-based layer with a thickness of more than 250 nm, the coated substrate having a haze of less than 2%, preferably less than 1.5% and further preferred less than 1%.

The haze values are given for unpolished coated products.

Preferably, the haze is very uniform over the entire surface of the product: it advantageously has a variation of less than 10% on the surface of the coated substrate between a point where its value is at its maximum and another point where its value is at its minimum.

Advantageously, the tin oxide-based layer ii) has a thickness of more than 350 nm, preferably more than 400 nm and further preferred more than 500 nm. There is no maximum thickness since the thicker the layer will be, the lower its conductivity will be. Practically, the tin oxide layer is generally lower than 1 μm.

It has been found that the thickness of the titanium oxide-based layer i) is advantageously higher than 3 nm, preferably higher than 5 and further preferred higher than 7 nm and lower than 45 nm, preferably lower than 25 nm and further preferred lower than 15 nm.

This layer is preferably deposited directly onto the glass.

The tin oxide-based layer ii) is preferably doped with one or more elements selected among fluorine, antimony, aluminium, chromium, cobalt, iron, manganese, magnesium, nickel, vanadium and zinc, preferably among fluorine and antimony. Those layers generally give to the coated product a reflection in the infrared of more than 80%, preferably more than 85 or 88%. When the tin-oxide based layer is doped with fluorine, the coated substrate can have a light transmittance (under illuminant C) higher than 70%, 75, or 77% when the substrate is a 4 mm clear soda-lime glass.

However, other substrates can be used, such as coloured or ultra-clear glasses of different thicknesses.

The sheet resistance of the coated product is advantageously as low as possible and preferably lower than 40 ohms/square, preferably lower than 15 ohms/square and further preferred lower than 12 ohms/square. The normal emissivity of the coated substrate is advantageously as low as possible and preferably lower than 0.3, preferably lower than 0.15 and further preferred lower than 0.12.

The coated substrate according to the invention can either reach a very good normal emissivity (for example lower than 0.12) together with a reasonably low haze (less than 2%, preferably 1%) or a very low haze (for example less than 1%) together with a reasonably good normal emissivity (lower than 0.3, preferably lower than 0.15).

In the same manner, the coated substrate can either reach a very low sheet resistance (for example lower than 12 ohms/square) together with a reasonably low haze (less than 2%, preferably less than 1%) or can reach a very low haze (for example less than 1%) together with a reasonably low sheet resistance (lower than 40 ohms/square, preferably lower than 20 ohms/square).

The layers of the stack are deposited preferably by gas phase pyrolysis (CVD) although other known methods can be used, for example liquid phase pyrolysis (spray).

The underlayer (i) of the coated product is preferably deposited in the float bath.

According to one particular embodiment, the underlayer (i) comprises a first, titanium oxide-based layer (ia) and a second, silicon oxide-based layer (ib) which has preferably a thickness higher than 15 nm, preferably higher than 20 nm and lower than 50 nm, preferably lower than 40 nm.

The coated substrate can advantageously reach a neutral colour in reflection. In particular, the colorimetric indices a and b (Hunter Lab system, C/2°) of the colour in reflection are comprised between −10 and +2, preferably between −5 and 0.

The coated substrate according to the invention can undergo a thermal treatment, for example a thermal toughening or bending.

Other layers can be added, e.g. as a top coat. In particular, smooth tin oxide topcoat can for example be deposited for increasing the haze while keeping its uniformity.

According to another aspect, the subject matter of the present invention is a process for the production of a coated substrate, characterised by the following steps:
a) at least one metal oxide-based underlayer (i) is deposited on a transparent glass-type substrate by chemical vapour deposition;
b) a tin oxide-based layer (ii) of more than 250 nm is deposited by chemical vapour deposition using a vaporised mixture of the following precursors: a tin source, a fluorine source and water, the volumetric ratio of water/tin source being lower than 10, preferably lower than 5 and further preferred lower than 1.

DETAILED DESCRIPTION

Preferably, the underlayer (i) is deposited onto the ribbon of glass when this is at a temperature in the range between 600 and 750° C., preferably between 620 and 720° C. and further preferred between 650 and 700° C.

The precursor used for depositing the underlayer (i) is preferably a non-chlorinated precursor, in particular a metal alcolate, in particular a titanium alcolate and the precursor used for depositing the layer (ii) is an organic and/or halogenated tin compound.

COMPARATIVE EXAMPLES

Known Stacks of Layers

Glass/$SnO_2$ (20 nm)/$SiO_2$ (25 nm)/$SnO_2$:F (400 nm)
normal emissivity: 0.13
haze: 0.8%
sheet resistance: 12 ohms per square While it would be conceivable in this stack of layers to attempt to increase the thickness of the $SnO_2$:F layer to decrease the emissivity and electric resistance, that would lead to a significant increase in haze higher than 1%.

Glass/$SiO_xC_y$ (75 nm)/$SnO_2$:F (320 nm)
normal emissivity: 0.15
haze: 0.5%
sheet resistance: 14 ohms per square The emissivity of this product is relatively high and increases substantially after toughening: up to values of 0.18 or 0.20, for example.

Glass/$SnO_2$: F (500 nm)
normal emissivity: 0.13
haze: 10%
sheet resistance: 40-100 ohms per square

EXAMPLES ACCORDING TO THE INVENTION

Example 1

An underlayer of $TiO_2$ with a thickness of 10 nm was deposited on a ribbon of clear soda-lime float glass (4 mm thickness) by CVD. The precursor used was titanium tetraisopropoxide (TTIP). The layer was deposited in the float tank when the ribbon of glass is at a temperature of about 660-700° C.

A second layer of tin oxide doped with fluorine of 500 nm was deposited on the first layer at the head of the lehr when the ribbon of glass was at a temperature of about 600-640° C. The precursor used was monobutyl-tin-trichloride (MBTC) combined with a fluorine source such as trifluoroacetic acid (TFA), ammonium bifluoride ($NH_4F.HF$) or hydrofluoric acid (HF), for example.

The coated substrate had a haze of about 0.3 to 0.5%, a normal emissivity of about 0.10-0.11 and a sheet resistance of about 9 ohms per square.

It has been unexpectedly found that despite the very important thickness of the $SnO_2$:F layer, the haze was maintained at very low values and was very uniform over the entire surface of the product.

The optical characteristics are: LT: 78%, LR: 14.5%,
Colour in reflection: a=−7; b=−3 (Hunter Lab system, illuminant C/2°)

Example 2

A layer of $TiO_2$ with a thickness of 9 nm was deposited by CVD, using the same precursor as in Example 1, on a ribbon of clear soda-lime float glass with a thickness of 4 mm. The layer was deposited in the float tank when the glass ribbon is at a temperature of about 700° C.

A second layer of silicon oxide with a thickness of 37 nm was deposited on the first layer also by CVD. The precursors used precursors are silane, oxygen and a carrier gas (N2). The layer is deposited in the float bath when the glass ribbon is at a temperature of about 650° C.

A layer of tin oxide doped with fluorine with a thickness of 440 nm was deposited on the second layer.

The coated substrate had a haze of about 0.8%, a normal emissivity of about 0.1 and a sheet resistance of about 8.6 ohms per square.

The optical characteristics are: LT: 80.5%, LR: 10.4%.
Colour in reflection: a=−3; b=−1 ((Hunter Lab system, illuminant C/2°)

The use of the intermediate layer of SiO2 presents the advantage of enabling the production of a coated glass with a lower level of colour in reflection while maintaining the relatively low haze and a good conductivity.

The invention claimed is:
1. A transparent glass-type substrate coated with a stack of thin layers comprising:
   i) at least one titanium oxide-based underlayer having a thickness higher than 3 nm and lower than 15 nm, and
   ii) a main tin oxide-based layer with a thickness of more than 250 nm, the coated substrate having
      (a) a haze of less than 2%,
      (b) a haze of less than 1.5% or
      (c) a haze of less than 1%.
2. The substrate according to claim 1, wherein the tin oxide-based layer ii) has
   (a) a thickness of more than 350 nm,
   (b) a thickness of more than 400 nm or
   (c) a thickness of more than 500 nm.
3. The substrate according to claim 1, wherein the titanium oxide-based layer i) is deposited directly onto the glass.
4. The substrate according to claim 1, wherein the tin oxide-based layer ii) is doped with one or more elements

(a) selected from the group consisting of fluorine, antimony, aluminium, chromium, cobalt, iron, manganese, magnesium, nickel, vanadium and zinc, or (b) selected from the group consisting of fluorine and antimony.

5. The substrate according to claim 1, wherein the sheet resistance of the stack of layers is lower than 40 ohms/square.

6. The substrate according to claim 1, wherein the normal emissivity of the coated substrate is lower than 0.3.

7. The substrate according to claim 1, wherein the normal emissivity of the coated substrate is lower than 0.12 and the haze is less than 2%.

8. The substrate according to claim 1, wherein the haze is less than 1% and the normal emissivity of the coated substrate is (a) lower than 0.3.

9. The substrate according to claim 1, wherein the sheet resistance of the coated substrate is lower than 12 ohms/square and the haze is less than 2%.

10. The substrate according to claim 1, wherein the haze is less than 1% and the resistance per square is lower than 20 ohms/square.

11. The substrate according to claim 1, wherein layers of the stack are deposited by gas phase pyrolysis (CVD).

12. The substrate according to claim 1, wherein the underlayer (i) is deposited in a float bath.

13. The substrate according to claim 1, wherein the underlayer (i) comprises a first, titanium oxide-based layer (ia) and a second, silicon oxide-based layer (ib).

14. The substrate according to claim 13, wherein the silicon oxide-based layer (ib) has a thickness in the range of (a) between 15 and 50 nm.

15. The substrate according to claim 1, wherein the substrate is obtained by a process comprising:

a) depositing at least one metal oxide-based underlayer on a transparent glass-type substrate by gas phase pyrolysis; and b) depositing a tin oxide-based layer of more than 250 nm by gas phase pyrolysis using a vaporised mixture of the following precursors: a tin source, a fluorine source and water, the volumetric ratio of water/tin source being lower than 10.

16. The substrate according to claim 15, wherein the at least one metal oxide based underlayer is deposited using non-chlorinated precursors.

17. The substrate according to claim 16, wherein the precursor used for depositing the underlayer is (i) a metal, or (ii) titanium.

18. The substrate according to claim 15, wherein the underlayer is deposited onto the ribbon of glass of which a temperature is in the range of between 600 and 750° C.

19. The substrate according to claim 15, wherein the precursor used for depositing the layer is (i) an organic tin compound, (ii) a halogenated tin compound or (iii) an organic halogenated tin compound.

* * * * *